United States Patent [19]

Doddato et al.

[11] 4,080,188

[45] Mar. 21, 1978

[54] DURABLE SUBSTRATES HAVING POROUS ANTIREFLECTION COATINGS

[75] Inventors: John A. Doddato, Addison; Michael J. Minot, Corning, both of N.Y.

[73] Assignee: Corning Glass Works, Corning, N.Y.

[21] Appl. No.: 743,972

[22] Filed: Nov. 22, 1976

[51] Int. Cl.[2] ............................................. C03C 15/00
[52] U.S. Cl. ...................... 65/31; 65/30 R; 65/111
[58] Field of Search ............ 65/22, 30 R, 33, 31, 65/111

[56] References Cited

U.S. PATENT DOCUMENTS

| | | | |
|---|---|---|---|
| 2,600,525 | 6/1952 | Ford | 65/22 X |
| 3,551,228 | 12/1970 | Meth | 65/31 X |
| 3,616,098 | 10/1971 | Falls | 65/31 |
| 3,811,852 | 5/1974 | Bondarev et al. | 65/22 |
| 3,938,974 | 2/1976 | Macedo et al. | 65/30 R |

*Primary Examiner*—S. Leon Bashore
*Assistant Examiner*—Frank W. Miga
*Attorney, Agent, or Firm*—William J. Simmons, Jr.; Walter S. Zebrowski; Clarence R. Patty, Jr.

[57] ABSTRACT

A porous layer is formed on a surface of a body of phase separable glass by heat treating the glass to cause it to become separated into at least two distinct phases of different solubility. A surface of the body is subjected to a leaching solution which preferentially leaches at least the most soluble phase, leaving a surface layer consisting of a skeletal structure that comprises the least soluble phase disposed on a substrate of phase separated glass. The glass body is then subjected to a second heat treatment at a sufficiently high temperature that the phase separated glass substrate is caused to become homogeneous, the porous surface layer remaining substantially unchanged. The resultant homogeneous glass substrate is more chemically durable than it was in the phase separated state.

7 Claims, 2 Drawing Figures

DURABLE SUBSTRATES HAVING POROUS ANTIREFLECTION COATINGS

CROSS-REFERENCE TO RELATED APPLICATIONS

This application is related to U.S. patent application Ser. No. 651,429, entitled "Method for Providing Broad-Band Antireflective Surface Layers on Chemically Durable Borosilicate Glasses," Elmer et al., now U.S. Pat. No. 4,019,884, and Ser. No. 651,416, entitled "Antireflective Layers on Phase Separated Glass," Minot et al., both filed on Jan. 22, 1976 and commonly assigned herewith, said applications being incorporated herein by reference.

BACKGROUND OF THE INVENTION

Antireflective films or layers are commonly employed on surfaces of such optical devices as lenses, windows, filters and the like. One area of recent interest, requiring a method of greatly reduced cost and complexity, is the application of antireflection films to glass envelopes for solar energy collectors. The reduction of reflection losses occurring at the collector envelope can substantially increase collector efficiency.

In general, the reflection of light from a surface depends not only on the angle of incidence of the light, but also upon the reflective index of the material forming the surface. For uncoated glass having a refractive index of about 1.5, the reflectance from a single surface is about 4% for light impinging at incident angles of less than about 50° from the normal.

There presently exists a highly developed technology for producing antireflective layers on the surfaces of optical devices. Heretofore, the highest quality coatings have been produced by vacuum deposition techniques. While such techniques are suitable for the batch treatment of small articles such as lenses, they are expensive and not readily adaptable to the continuous production of antireflective layers on large articles. Particular difficulty is encountered in attempting to provide antireflective layers on surfaces of articles of complex shape such as the interior walls of tubular glass envelopes for solar energy collection devices. Single-layer coatings which are simple to apply, are adequate in some applications, but they have some serious limitations. The lowest reflectance that can be attained for crown glass, for example, using practical materials, is 1.33%. Moreover, the low reflectance property is operative over a narrow band of wavelengths and rises rather sharply at wavelengths that are longer and shorter than the wavelength of minimum reflectance. Multiple layer films have usually been employed to provide low reflectance over a broader band of wavelengths. However, the processes by which such multiple layer films are deposited are costly and complex, 15 or more layers being required to form some commercial broad band antireflective films. Attempts have been made to produce surface layers having antireflective properties by techniques whereby leachable components are removed from the glass, leaving a skeletonized porous surface having a lower reflective index than the bulk glass. In accordance with such prior art techniques, etching is permitted to proceed to an extent sufficient to provide a skeletonized surface layer, of a depth approximating an odd multiple of one-fourth the wavelength of the light to be transmitted, to reduce reflectance of that light by the treated surface.

Most of the known etching processes involve complex etching solutions and procedures which must be designed specifically for the type of glass composition to be treated. U.S. Pat. No. 2,348,704 to Adams, for example, describes a procedure for treating barium crown glass by removing the alkali, alkaline earth, and other bivalent metal oxides from the glass, and thereafter treating the glass with hydrofluoric acid to enlarge the pore structure of the residual siliceous layer. A single leaching step is taught in U.S. Pat. Nos. 2,486,431 to Nicoll et al. and 2,490,662 to Thomsen which describe methods for treating soda-lime glasses or optical crown glasses with complex, silica-saturated solutions of fluosilicic acid, in order to provide antireflective surface films thereon. The Nicoll et al. and Thomsen etch solutions are complex, and if the solution is not sufficiently saturated it will completely dissolve the glass surface. Moreover, if it is over saturated, it will lay down a coat of $SiO_2$ on the glass surface. It is stated in the aforementioned U.S. Pat. No. 2,490,662 that the treating solution dissolves out of the surface of the glass substantially all of the metallic oxides and some of the silica thereby producing a zone very shallow in depth consisting of silica molecules. It is further stated therein that it appears that silica is simultaneously dissolved from the glass surface and redeposited at spaced points so that a porous layer of silica is built up on the glass surface. The solutions are subject to rapid chemical change, hence requiring constant careful monitoring.

Prior art etching processes generally resulted in surface films which had low abrasion, weather and chemical durabilities and were not effective to produce efficient antireflective surface layers on durable glasses such as borosilicate glasses. As noted by L. Holland in *The Properties of Glass Surfaces*, Wiley & Sons, New York, (1964) on pages 155 and 165, acid etching processes did not produce antireflective films on the surfaces of chemically-durable borosilicate glasses. Holland points out that the production of antireflective films by chemical etching was deemed of little practical value in view of the weak and optically inefficient nature of the films so produced. A further disadvantage of such prior art processes was the inability to control the optical and physical characteristics of the film by controlling such parameters as the shape, size and density of pores in the surface layer.

It has been recently discovered that broad-band antireflective layers can be formed on the surface of such glasses as chemically durable borosilicate glass. The aforementioned related applications disclose methods of forming such layers by subjecting a glass article to a heat treatment temperature under the phase separation liquidus temperature, said temperature being sufficiently high and being applied for a sufficient duration of time to induce phase separation in the glass. Thereafter, the glass article is contacted with an aqueous treating solution for a time sufficient to leach from a surface layer of the article the more soluble of the phases, at least the least soluble of the phases remaining as a porous, skeletonized layer. The layer has a thickness less than 10,000A and exhibits a gradient refractive index which is such that the reflectance of the layer is less than 0.25% throughout the visible region of the spectrum for each surface. The phase separation heat treatment, which results in the growth of a soluble phase, which can be removed from the surface of the glass article by leaching, of necessity lowers the chemical durability of the resultant glass article.

For additional discussion concerning the decrease in durability of borosilicate glass due to phase separation, see the publication: B. F. Howell et al, "Loss of Chemical Resistance to Aqueous Attack in a Borosilicate Glass Due to Phase Separation," Ceramic Bulletin, Vol. 54, No. 8 (1975) pp. 707–709.

SUMMARY OF THE INVENTION

It is therefore an object of the present invention to improve the durability of glass articles that have been provided with skeletonized, antireflective surface layers.

Briefly, the present invention pertains to a method of forming a porous antireflective surface layer on a glass article. Initially, there is provided an article of phase-separable glass which, upon heat treatment, is capable of separating into at least two phases of different solubility. The glass article is heated to a temperature under the phase separation liquidus temperature, said temperature being sufficiently high and being applied for a sufficient duration of time to induce phase separation in the glass. Since it is not presently known whether phase separable glasses are completely homogeneous prior to receiving a phase separation heat treatment or instead comprise a plurality of microphases so small as to be undetectable by an electron microscope, the step of "inducing phase separation" is intended to include the growth of microphases from a state of imperceptibility as well as the initiation of growth of microphases from a homogeneous glass. The glass article is contacted with an aqueous treating solution for a time sufficient to leach from a surface layer of the article the more soluble of the phases, at least the least soluble of the phases remaining as a porous skeletonized layer which exhibits a gradient refractive index thereacross. Thereafter, the glass article is heated to a temperature at least as high as the phase separation liquidus temperature but lower than that temperature at which deformation of the article can occur, to remix the phases formed by the first heat treatment and create a homogeneous, durable glass article. The skeletonized layer has a thickness less than 10,000A and exhibits a gradient refractive index thereacross which is such that the reflectance of the layer is less than 0.25% throughout the visible region of the spectrum for each surface.

BRIEF DESCRIPTION OF THE DRAWINGS

FIG. 1 shows percent reflectance before and FIG. 2 shows percent reflectance after the second heat treatment. A break in the curves between 0.7 and 1.0 microns is indicative of the fact that each curve is a composite of curves obtained by two different instruments.

DETAILED DESCRIPTION

Figure 1:
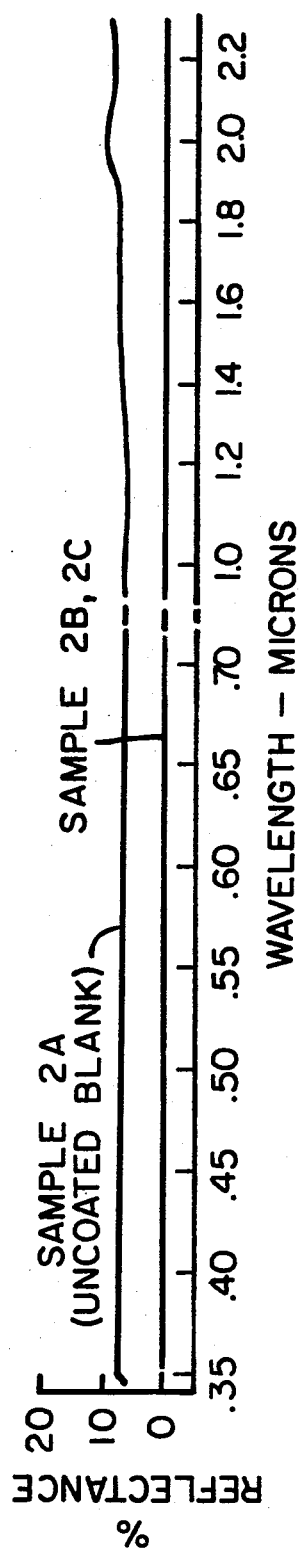
FIGS. 1 and 2 are graphs showing percent reflectance v. wavelength of light for glass substrates having antireflective layers thereon.

The production of antireflective surface layers in accordance with the present invention requires that the glass body be subjected to a predetermined phase-separation heat treatment, a subsequent chemical treatment in an etch/leach solution, and a second heat treatment to rehomogenize the phases. The phase-separation heat treatment causes the formation and/or growth of two or more phases, at least one of which is substantially more soluble than the others. Following the phase separation heat treatment, the glass article is subjected to a solution in which the more soluble phase is readily dissolved away leaving a skeletonized layer comprising at least the least soluble phase. The soluble phase is removed by leaching; however, it may be desirable to incorporate in the chemical treatment solution an etchant capable of attacking the less soluble phase to enlarge the pores. Since the composition of the phase separable glass and the time and temperature of the initial heat treatment determine the characteristics of the antireflective layer, the optical characteristics of the resultant optical device can be tailored to provide broad band, low reflectance properties.

Glasses suitable for treatment in accordance with the present invention are those which develop at least two phases of different solubility when subjected to a controlled heat treatment and which, when subjected to a second heat treatment at a temperature at least as high as the phase separation liquidus temperature, again forms a homogeneous glass in which the phases have recombined or have become so minute as to be imperceptible. Such glasses are well known. U.S. Pat. Nos. 2,106,744, 2,215,039, 2,221,709, 2,315,329, 2,340,013, 2,480,672, 3,758,284 and 3,785,793 discuss phase separation and growth in borosilicate glasses. A large portion of the text "Structure & Crystallization of Glasses" by W. Vogel, Pergamon Press, edition Leipzig, 1971 is devoted to phase separable glasses. It is pointed out on pages 80–81 of that text that the microstructure into which the various phass form is determined by such factors as concentration of the main glass components, the temperature history of the glass, the field strength of the cations present in the glass, trace additions of particular ions such as sulphates, and the surrounding gas atmosphere.

The composition of the phase separable glass must be such that a suitable antireflective layer can be formed by heat treating and leaching the glass article. For example, the physical characteristics of the resultant antireflective layer, such as its expansion properties, must be compatible with those of the bulk glass. Shrinking of hydrated layers on drying can deleteriously affect antireflective layers. For example, some glasses, when subjected to the method of the present invention, form antireflective layers which initially appear to be acceptable but which begin to craze and flake upon drying. Those compositions which ultimately result in a film which contains such defects as frosting, flaking, spalling and the like are not within the scope of the present invention. Some phase separable glasses which become cloudy when subjected to a phase separation heat treatment may not be useful for optical devices due to the low transmissivity thereof, but they still may be useful in architectural applications, for example, wherein low reflectivity but not high transmissivity is required.

Preferred glass compositions are the chemically-durable borosilicate glasses in which phase growth can be induced by heat treatment. These include the very durable aluminoborosilicate glasses, as well as the somewhat durable borosilicates containing minor modifying additions of other oxides. Suitable compositions include, in weight percent on the oxide basis, about 55–82 wt.% $SiO_2$, 12–30 wt.% $B_2O_3$, 2–12 wt.% total of alkali metal oxides, and 0–7 wt.% $Al_2O_3$, these constituents constituting at least about 93 wt.% of the glass. The alkali metal oxides may be selected from the group consisting of $Na_2O$, $K_2O$ and $Li_2O$. The glasses may contain minor additions of certain other oxides provided these additions do not deleteriously affect the durability or phase separation and growth characteristics of the glass. Examples of such oxides include $PbO$, $P_2O_5$, $MgO$, $CaO$, $BaO$ and the like. However, the total of any such oxide additions should not exceed about 4 wt.% if the required chemical and physical properties are to be maintained. Glasses containing less silica or more $B_2O_3$ or alkali then specified exhibit insufficient chemical durability for use in the invention, whereas glasses containing excessive $SiO_2$ and insufficient alkali and $B_2O_3$ either do not exhibit the phase-separation characteristics required for the production of antireflective surface layers or are difficult to melt. The presence of $Al_2O_3$ in amounts ranging about 1-4 wt.% is helpful in maintaining chemical durability. An example of a particularly suitable glass for the production of antireflective surface layers is Corning Code 7740 glass, commercially available from Corning Glass Works, Corning, New York 14830.

After a glass composition has been selected, the particular phase separation heat treatment to which it is subjected can influence structural and compositional features of the microporous surface layer, thereby determining the optical characteristics of the resultant antireflective layer. A discussion of the effect of various heat treatments on phase separable glasses can be found in the aforementioned U.S. Pat. No. 2,106,744. The heat treatment, to some extent, depends upon the composition chosen and generally comprises heating the glass at a temperature above 500° C but below a temperature, herein referred to as the phase separation liquidus temperature, above which the distinct phases of the glass can be made to essentially disappear or revert to miscibility. At temperatures below about 500° C viscosities are too high to permit a phase separation that can be of value for the process of the present invention. As would be expected, higher temperatures require shorter heat treatment periods. Borosilicate glasses should be heat treated at a temperature above 525° C, but below the phase separation liquidus temperature for such glasses. Whereas the heat treatment at 525° C would require a few days, only a few hours would be necessary at temperatures around 600° C, for example. The heat treatment may be carried out upon cooling of the glass body after it has been formed from the melt or after it has been cooled to room temperature.

When heat treating a glass article which is at room temperature, different types of phase separation and phase growth occur depending upon whether the article is heated to a temperature above the phase separation liquidus temperature prior to being subjected to a temperature lower than the phase separation liquidus temperature. A discussion of various heat treatments of borosilicate glasses and the types of phase separation which result therefrom can be found in the publication "Phase Separation in Borosilicate Glasses as Seen by Electron Microscopy and Scanning Electron Microscopy," T. H. Elmer et al., Journal of the American Ceramic Society, Vol. 53, No. 4, Apr. 1970, pp. 171-175. In general, when the glass is subjected to heat treatment, the microphases increase in size with temperature and time. If the glass is initially heated above its phase-separation liquidus temperature and then allowed to cool to the desired temperature of heat treatment, the phase having the higher surface tension will assume a droplet form with little tendency for these droplets to coalesce to form an interconnecting phase. However, if the glass is heated to a temperature less than the phase separation liquidus temperature, the phase separated structure of both phases is of the wormy interconnected type rather than discrete particles or droplets. The microstructure becomes coarser with longer heating times and/or higher temperatures. The ability to control the size and shape of the glass microstructure by controlled heat treatment permits tailoring of the optical and physical characteristics of the resultant film.

Some of the practical applications of the present invention include display windows, green house windows, solar collectors and the like. Since such devices are exposed to a variety of naturally occurring weather conditions as well as to airborne pollutants, it is desirable to employ as substrate materials durable glasses such as the aforementioned chemically durable borosilicate glasses. In order to obtain useful antireflective characteristics, such glasses are preferably heated to a temperature in the range of about 550°-700° C for a time in the range of about 1-10 hours, preferably about 1-5 hours, and thereafter slowly cooled to room temperature. The optimal temperature depends upon the composition of the glass. For example, the phase separation liquidus temperature for some borosilicate glasses may be as low as 685° C. The phase separation heat treatment temperature for such glass must therefore be less than 685° C. The second heat treatment, to be hereinafter discussed in greater detail would be performed at a temperature in excess of 685° C in order to achieve homogenization within a reasonable period of time.

In accordance with the aforementioned Elmer et al. patent application, borosilicate glasses within a limited composition region are heat treated at a temperature in the range of about 630°-660° C for a time in the range of about 1-4 hours to obtain the separated phase characteristics required for extremely broad-band antireflective properties, i.e., a reflectivity less than 1% between about 0.35 and 2.5 μm. Preferred glass compositions for this purpose are the alumino borosilicate glasses which contain low concentrations of non-essential oxides such as $PbO$, $P_2O_5$, $CaO$, $MgO$, $BaO$ and the like. Operative glasses for this purpose consist essentially, in weight percent on the oxide basis, of about 72-82% $SiO_2$, 13-16% $B_2O_3$, 3-10% alkali metal oxides and 0-4% $Al_2O_3$, these oxides constituting at least about 93% by weight of the glass.

During the manufacture and/or heat treatment of the described borosilicate glasses, a glassy layer which is rich in silica is formed on surface portions of the glass. This layer retards extraction of the soluble phase formed in the glass on heat treatment. Formation of the skin can be prevented by controlling the gas atmosphere surrounding the glass during forming and annealing. If a skin does form on the surface of the phase separable glass, it is desirably removed prior to or during the removal of the soluble phase. Removal may be accomplished by any conventional means, including mechanical grinding or chemical etching procedures. However, the preferred method is to chemically remove some silica while leaching the soluble phase by means of solutions containing both hydrogen and fluoride ions, for example, solutions containing HF or $NH_4F \cdot HF$. Concentrated solutions of these fluoride compounds comprise the most convenient means of removal. Reaction times are considerably reduced when 10% $NH_4F \cdot HF$ is used in conjunction with 0.52N $H_2SiF_6$. Hot concentrated NaOH has also been employed for skin removal.

It is known that the soluble phase present in phase separated glasses can be removed by a variety of media, including pure water and any of a number of aqueous solutions of mineral acids. Some suitable film forming solutions are HF, NaOH and $NH_4F \cdot HF$ alone or combined with $NHO_3$, $H_2SiF_6$ or $H_2SO_4$. Other suitable solutions include $H_3PO_4$, HCl, $NH_4F$ and $Na_2CO_3$. Considerations such as reaction time, pollution and the like may determine the particular chemical treatment solution to be employed. For example, ammonium bifluoride alone produces effective antireflective layers. However, the reaction time for this process is considerably longer than that required when ammonium bifluoride is combined with another acid. Nitric acid combined with ammonium bifluoride has been found to be effective in the formation of antireflective layers on borosilicate glasses. However, fluosilicic acid combined with ammonium bifluoride does not pose the environmental-waste treatment difficulties that result from the use of nitric acid and ammonium bifluoride.

The chemical reaction which forms the antireflective layer may take place over a wide range of operating temperatures. The aforementioned Minot et al. application teaches that a reaction temperature of 80° C is preferred over a reaction temperature of 45° C because at the higher temperature film formation proceeds more rapidly and is less sensitive to slight errors in process timing for a given glass composition. Moreover, it is pointed out therein that the sensitivity of the resultant optical properties of a layer to the duration of the chemical leaching treatment is a function of the phase separation heat treatment temperature. The optical properties of samples prepared at 630° C, for example, were less sensitive to errors in process timing than similar samples phase separated at 600° C. Also, broadband reflectivity in the near infrared region of the spectrum as well as the visible region can be achieved by a phase separation heat treatment between about 630° C and 660° C. Regardless of the particular processing temperatures employed, the reflectance of the layer will initially decrease as the leaching process continues, until a first minimum reflectance is achieved. Thereafter, as taught in the aforementioned Minot et al. application, the reflectance of the layer may cyclically vary or may remain relatively constant.

It is therefore evident that each individual process will have to be analyzed to determine the length of time that the phase separated glass body must be subjected to a leaching solution. For a particular glass, phase separation heat treatment and leaching solution, the reflectance may decrease to a minimum and thereafter begin to increase and decrease with increased leaching time although process parameters can be optimized to virtually eliminate undulations in the time-reflectance curves after the first minimum reflectance has been attained. Since it is preferable to process a sample in as short a time as possible, the time required to attain the first minimum reflectance level should be determined and should thereafter be employed for that particular glass and set of heat treatment and leaching parameters.

Available evidence suggests that the antireflective layers so formed are predominantly porous silica, have an apparent thickness in the range of about 1000–10,000A, and exhibit that kind of antireflective characteristics that is provided by a graded refractive index layer.

After an antireflective layer has been formed on the surface of the glass article in accordance with the teachings of the Elmer et al. or Minot et al. applications, the durability of the substrate is lower than it had been prior to the phase separation heat treatment, since the substrate now comprises at least two phases, one of which is more soluble than the other. In accordance with the present invention the durability of the glass substrate is improved with substantially no change in the optical properties of the antireflective layer. This is accomplished by subjecting the substrate-antireflective layer composite to a temperature at least as high as the phase separation liquidus temperature for a period of time sufficient to at least initiate a remixing of the phases formed by the first heat treatment. As the second heat treatment is continued the durability increases as the phases continue to remix until the substrate comprises a substantially homogeneous glass. Depending upon the composition of the glass substrate, it may be necessary to support the substrate or to discontinue the second heat treatment prior to complete remixing of the phases to prevent thermal deformation of the article being treated. The high silica content of the antireflective layer enables it to withstand this second heat treatment without detrimental effects.

Durable glass articles having broad-band antireflective surface layers thereon can be provided in accordance with the following specific examples.

EXAMPLE 1

A section of 4 inch diameter glass tubing having a composition, in weight percent, of about 79.1% $SiO_2$, 13.7% $B_2O_3$, 4.9% $Na_2O$ and 2.3% $Al_2O_3$, was selected for treatment. The section of tubing was cut into one by three inch samples which were heated in an electric furnace to a temperature of about 600° C ± 15° C, maintained at that temperature for about 3 hours, cooled at furnace rate to room temperature and removed from the furnace.

Following heat treatment the phase-separated glass samples were etched for 30 minutes in a 10% (weight) aqueous solution of $NH_4F \cdot HF$ to remove the siliceous surface skin present on the glass. Thereafter, the etched glass samples were immersed in a treating solution consisting of 0.1% (weight) solution of $NH_4F \cdot HF$ + 0.16N $HNO_3$, which was maintained at a temperature of 45° C. The immersion was continued for 20 minutes after which the samples were removed from the treating solution, rinsed in distilled water and dried.

The glass samples were divided into two groups, the first group constituting a control group and the second group being subjected to a second heat treatment at 750° C for 15 minutes. The purpose of this reheat treatment was to remix or rehomogenize the phases which had been formed and/or grown during the first heat treatment, thereby creating a homogeneous, more durable glass substrate. Following this heat treatment the second group of samples was quenched from the oven temperature to room temperature to prevent any recurrence of phase separation.

To ascertain the effect of the second heat treatment on the optical properties of the antireflective layers, reflectance spectra were taken before and after the samples of the second group were subjected to the 750° C heat treatment. No significant change in optical properties caused by the second heat treatment could be seen.

The improvement in substrate durability as a result of the second heat treatment was determined by subjecting the glass samples from both the first and the second groups to the "Miniature Acid Powder Test." The miniature powder test for the estimation of glass durability has been reported in the publication: D. L. Rothermel et al., "Flame Photometric Estimation of Durability of Glass," American Ceramic Society Bulletin, vol. 31, No. 9, pp. 324–325 (1952). The reliability of this test as applied to the glasses compared herein is enhanced since all glasses have the same composition, the only difference being the heat treatment, if any, to which the glass has been subjected. In accordance with this test, approximately one gram of glass to be evaluated was crushed to 40–50 mesh size, whereby that glass exhibited an effective surface area between 160 and 172 cm$^2$. Five milliliters of 1/50N sulfuric acid was added to the crushed glass and permitted to react for four hours at 90° C. The solution was evaluated by the flame photometry technique to determine the weight percent $Na_2O$ extracted. The results of these tests appear in Table 1, which lists the wt.% $Na_2O$ extracted from the substrate glass (a) as melted, (b) after an antireflective layer has been formed thereon, i.e., a sample from the first group, and (c) after a second heat treatment at 750° C, i.e., a sample from the second group. The durability of the glass correlates with the wt.% $Na_2O$ extracted in this test. A greater wt.% $Na_2O$ is extracted from low durability glasses than from glasses which exhibit a high durability.

TABLE 1

| Sample | | Wt.% $Na_2O$ Extracted |
|---|---|---|
| (a) | as-melted substrate glass | 0.004 |
| (b) | substrate glass after phase separation heat treatment and antireflective layer formation | 0.107 |
| (c) | substrate similar to sample (b) but rendered durable by second heat treatment | 0.008 |

It can be seen that the second heat treatment improves durability by more than a factor of ten. Extensive experience with the standard powder test has indicated a reliability factor of ±0.002.

EXAMPLES 2–4

Nine samples, 1 by 3 inch, were cut from a 4 inch diameter glass tube having a composition as set forth in Example 1. Samples 2A, 3A and 4A were neither heat treated nor etched and served as blanks in the spectrophotometric and powder durability tests. Samples 2B, and 2C were phase separated at 600° C, 3B and 3C at 630° C and 4B and 4C at 660° C. Specific details of the phase separation heat treatment are given in Table 2 wherein temperature is in degrees celcius.

TABLE 2

| Sample | Heat UP | Hold | | | | Cool Down | | |
|---|---|---|---|---|---|---|---|---|
| | | 30 Min | 60 Min | 120 Min | 180 Min | 60 Min | 120 Min | 180 Min |
| 2B and 2C | 200–600 at 400/hr | 603 | 600 | 600 | 600 | 600–505 at 90°/hr | 505–445 at 60°/hr | 445–395 at 50°/hr |
| 3B and 3C | 270–635 at 365/hr | 633 | 630 | 628 | 628 | 628–530 at 98°/hr | 530–465 at 65°/hr | 465–415 at 50°/hr |
| 4B and 4C | 290–668 at 478/hr | 665 | 660 | 660 | 660 | 660–560 at 100°/hr | 560–490 at 70°/hr | 490–460 at 60°/hr |

Following the phase separation heat treatment, samples 2B, 2C, 3B, 3C, 4B and 4C were subjected to the film forming procedure described in Table 3. The skin removing pre-etch was 10% $NH_4F$-HF (100 gms $NH_4F$-HF + 900 ml $H_2O$) at room temperature, and the film forming solution was 0.15% $NH_4F$-HF + 0.26N $H_2SiF_6$ (1.5 gms $NH_4F$-HF + 950 ml $H_2O$ + 50 ml (30%) $H_2SiF_6$) at 80° C.

TABLE 3

| Sample | Skin Removing Pre-Etch | Film Forming Solution |
|---|---|---|
| 2B | 45 min | 2 min |
| 2C | " | " |
| 3B | " | 2.5 min |
| 3C | " | " |
| 4B | " | 3 min |
| 4C | " | " |

Samples 2C, 3C and 4C were subjected to a phase homogenizing heat treatment at 750° C for 15 minutes after which they were referred to as 2CX, 3CX and 4CX, respectively. At these temperatures the sample will stick to a ceramic setter. This problem is eliminated by placing the sample on a platinum sheet while in the furnace. The samples were put into the already hot furnace, held there for 15 minutes and removed to quench in air.

Figure 2:
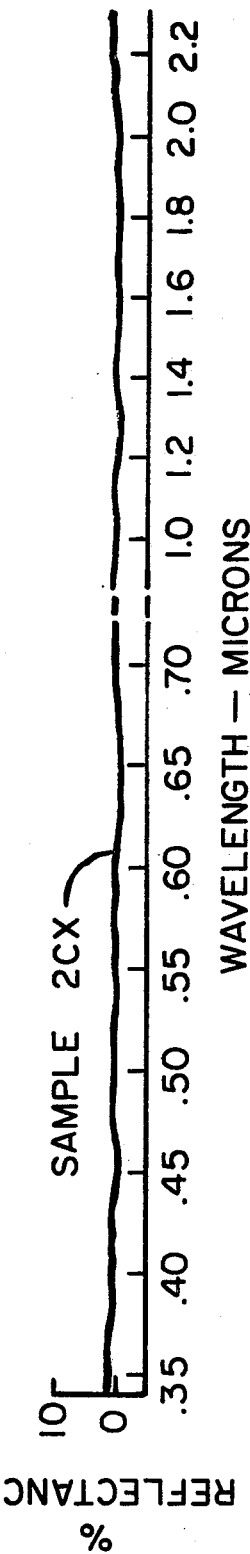

FIG. 1 shows the percent reflectance plotted as a function of wavelength for samples 2A, 2B and 2C. The percent reflectance of the uncoated blank 2A is seen to decrease to less than 0.5 percent after an antireflective layer is formed thereon. As shown in FIG. 2, which is a spectral reflectance graph for example 2CX, the percent reflectance is substantially unaffected by the phase homogenizing heat treatment.

The results of the miniature powder durability tests on samples 2, 3 and 4 showed that the durability of the porous antireflective layers were enhanced without significantly changing their reflectance or transmittance properties. Table 4 indicates that the degree of phase separation increases markedly, reaching an apparent maximum between 600° C and 660° C. It is noted that the heat treatment listed for samples 2CX, 3CX and 4CX is in addition to the heat treatment given to samples 2B, 3B and 4B.

TABLE 4

| Sample | 2A | 2B | 2CX |
|---|---|---|---|
| Heat Treatment | No heat | 3 hrs/600° C | 0.25 hrs/750° C |
| wt.% $Na_2O$ Extracted | 0.0032% | 0.084% | 0.0042% |
| Sample | 3A | 3B | 3CX |
| Heat Treatment | No heat | 3 hrs/630° C | 0.25 hrs/750° C |
| wt.% $Na_2O$ Extracted | 0.039% | 0.178% | 0.0077% |
| Sample | 4A | 4B | 4CX |
| Heat Treatment | No heat | 3 hrs/660° C | 0.25 hrs/750° C |
| wt.% $Na_2O$ Extracted | 0.0031% | 0.070% | 0.0051% |

The weight percent alkali extracted from the sample that was phase separated at 630° C is higher, by a factor of two, than that extracted from the samples phase separated at 600° C or 660° C. Following the second heat treatment, the weight percent extracted was lowered by factors of 20, 23 and 13, depending upon the initial phase separation heat treatment.

Comparison of the reflectance and transmittance spectra of samples 2, 3 and 4 was similar to that of Example 1 in that they showed very little change in optical properties following the second heat treatment. The average reflectance and transmittance change due to the second heat treatment ($\overline{\Delta R}$ and $\overline{\Delta T}$) were determined for samples 2B and 2C; 3B and 3C; and 4B and 4C and are given in Table 5.

TABLE 5

| Difference Between Samples | $\overline{\Delta R}$ | $\overline{\Delta T}$ |
|---|---|---|
| 2B and 2CX | −0.40 | +0.54 |
| 3B and 3CX | −0.28 | +0.42 |
| 4B and 4CX | −0.27 | +0.59 |

The negative numbers in Table 5 correspond to increases after the second heat treatment, i.e., increased reflection, and the positive numbers correspond to decreases after the second heat treatment, i.e., reduced transmission. Considering experimental error, the percent reflection and percent transmission did not significantly change due to the second heat treatment.

We claim:

1. A method of forming a porous antireflective surface layer on a glass article which comprises the steps of:
    providing an article of phase-separable glass which, upon heat treatment, is capable of separating into at least two phases of different solubility,
    subjecting the glass article to a first heat treatment at a temprature under the phase separation liquidus temperature, said temperature being sufficiently high and being applied for a sufficient duration of time to enhance phase separation in said glass;
    contacting said glass article with a treating solution for a time sufficient to leach from a surface layer of said article the most soluble of said phases, at least the least soluble of said phases remaining as a porous skeletonized layer which exhibits a gradient refractive index thereacross, and
    subjecting said glass article to a second heat treatment at a temperature at least as high as its phase separation liquidus temperature for a period of time sufficient to increase the durability of said article by initiating the recombination of said at least two phases into a homogeneous glass the optical properties of porous skeletionized layer remaining substantially unchanged.

2. The method of claim 1 wherein said second heat treatment temperature is at least 685° C.

3. The method of claim 1 wherein said glass article consists of a borosilicate glass and the step of subjecting said glass article to a second heat treatment comprises heating said article to a temperature in the range of about 750° C.

4. The method of claim 3 wherein said glass article is composed of a glass having an oxide composition, in weight percent, of about 72–82% $SiO_2$, 13–16% $B_2O_3$, 3–10% total of alkali metal oxides, and 0–4% $Al_2O_3$, these constituents constituting at least about 93 weight percent of the glass.

5. The method of claim 1 wherein the step of contacting said glass article with an aqueous treating solution is terminated while the thickness of said surface layer is less than 10,000Å.

6. The method of claim 1 wherein the step of contacting said glass article with an aqueous treating solution is terminated while the percent reflectance from said layer is at its first minimum level.

7. The method of claim 1 wherein the borosilicate glass article has an oxide composition, in weight percent, of about 76–82% $SiO_2$, 13–15% $B_2O_3$, 4–6% $Na_2O$, and 1–4% $Al_2O_3$, these oxides making up at least 99% by weight of the glass.

* * * * *

UNITED STATES PATENT AND TRADEMARK OFFICE
CERTIFICATE OF CORRECTION

PATENT NO. : 4,080,188
DATED : March 21, 1978
INVENTOR(S) : John A. Doddato and Michael J. Minot It is certified that error appears in the above-identified patent and that said Letters Patent are hereby corrected as shown below:

Column 1, line 7, "application" second occurrence, should be -- applications --.

Column 1, line 28, "reflective" should be -- refractive --.

Column 1, line 62, "reflec-" should be -- refrac- --.

Column 4, line 28, "phass" should be -- phases --.

Column 7, line 3, "$NHO_3$" should be -- $HNO_3$ --.

Column 9, Table 2, line 12, "478/hr should be -- 378/hr --.

Signed and Sealed this

Twenty-fourth Day of October 1978

[SEAL]

Attest:

RUTH C. MASON
Attesting Officer

DONALD W. BANNER
Commissioner of Patents and Trademarks